Oct. 31, 1950     S. C. HETH     2,528,275
SELF-PROPELLED COMBINATION HARVESTING
AND THRESHING MACHINE
Filed May 31, 1946     9 Sheets-Sheet 6
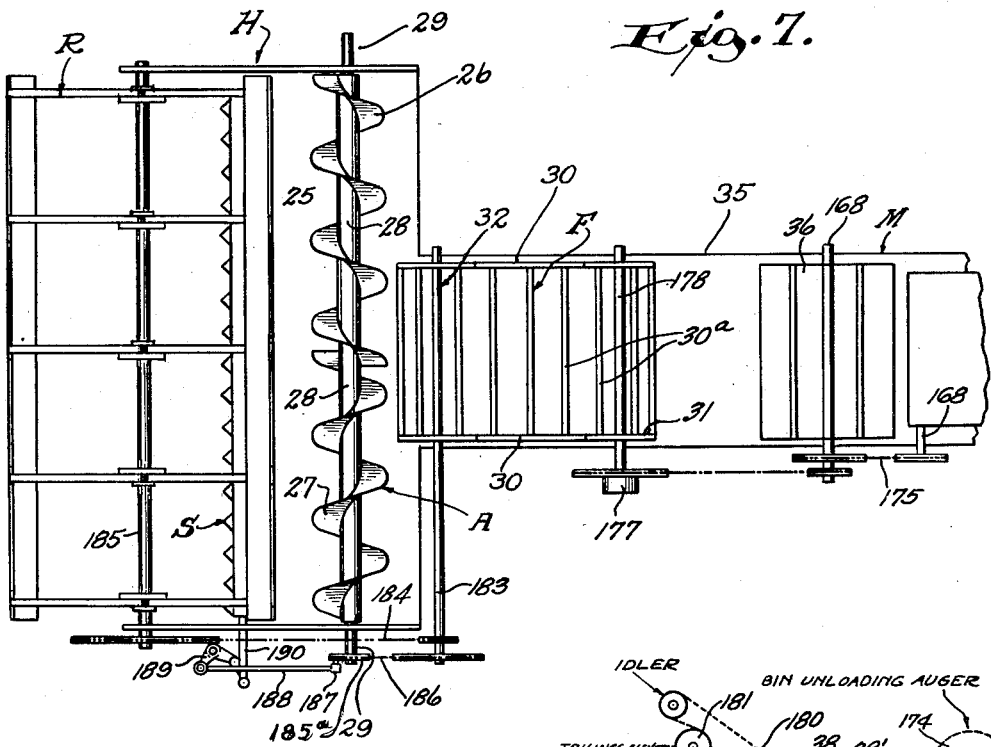
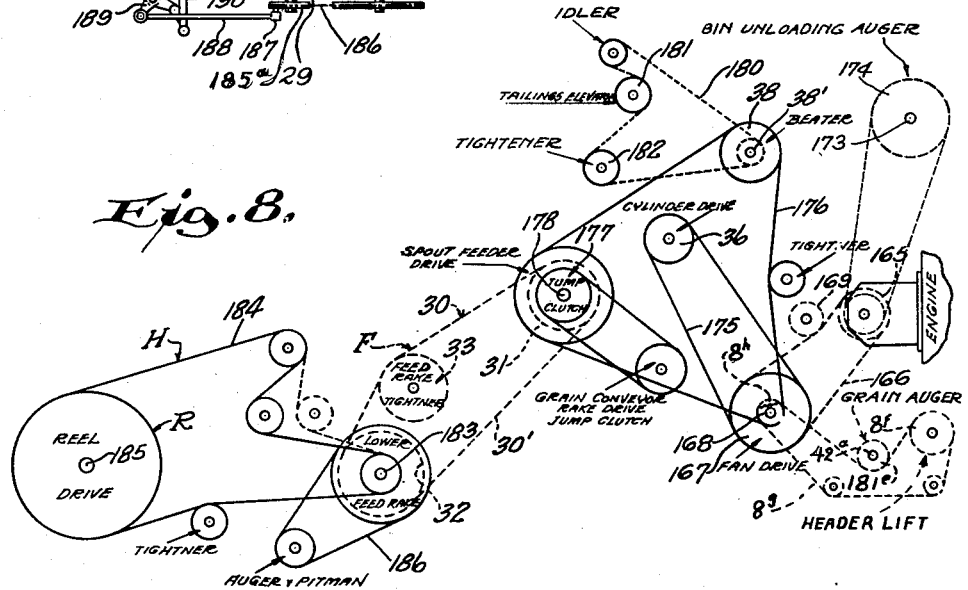
INVENTOR.
SHERMAN C. HETH
BY
Emerson B Donnell
ATTORNEY.

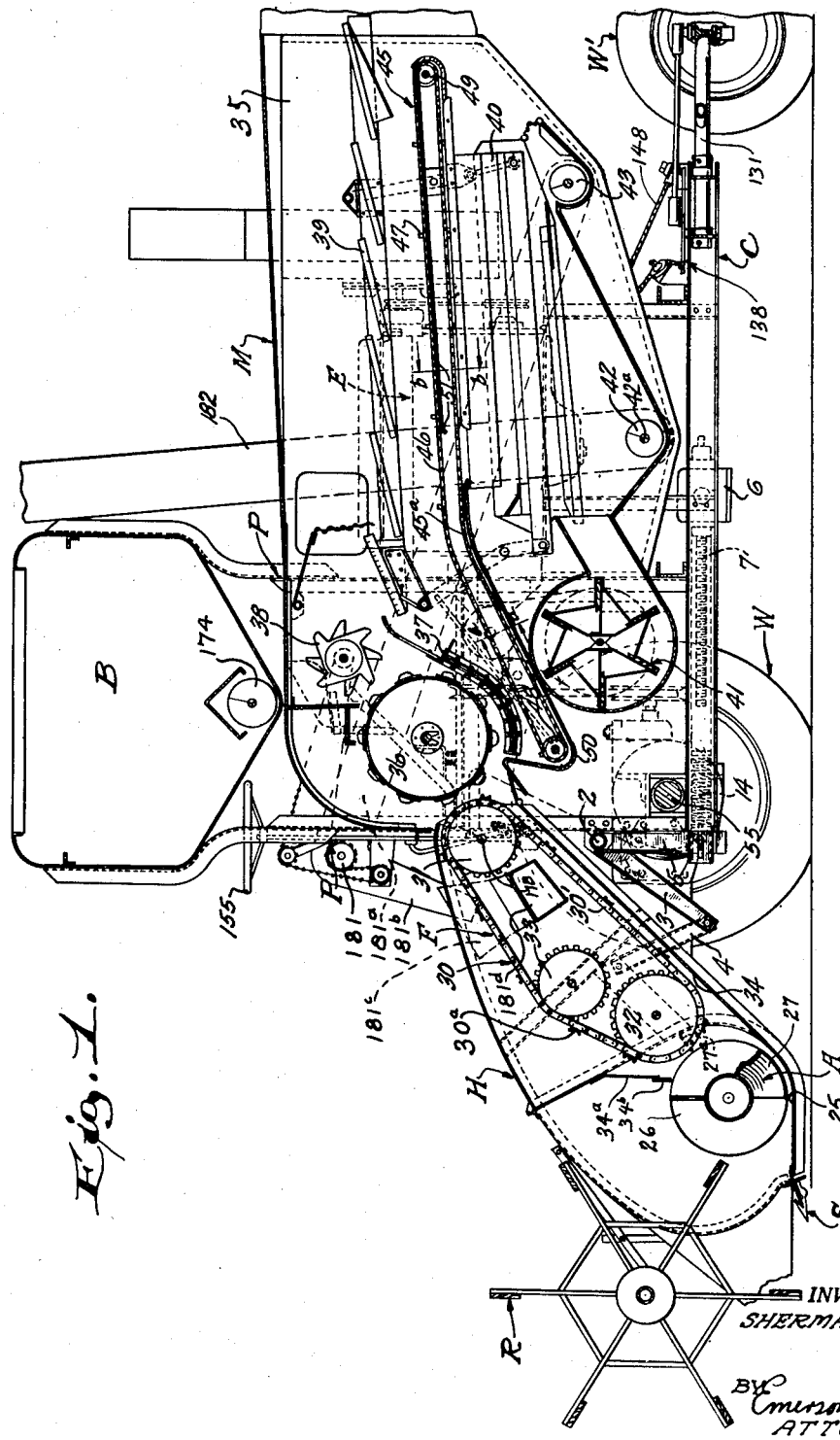

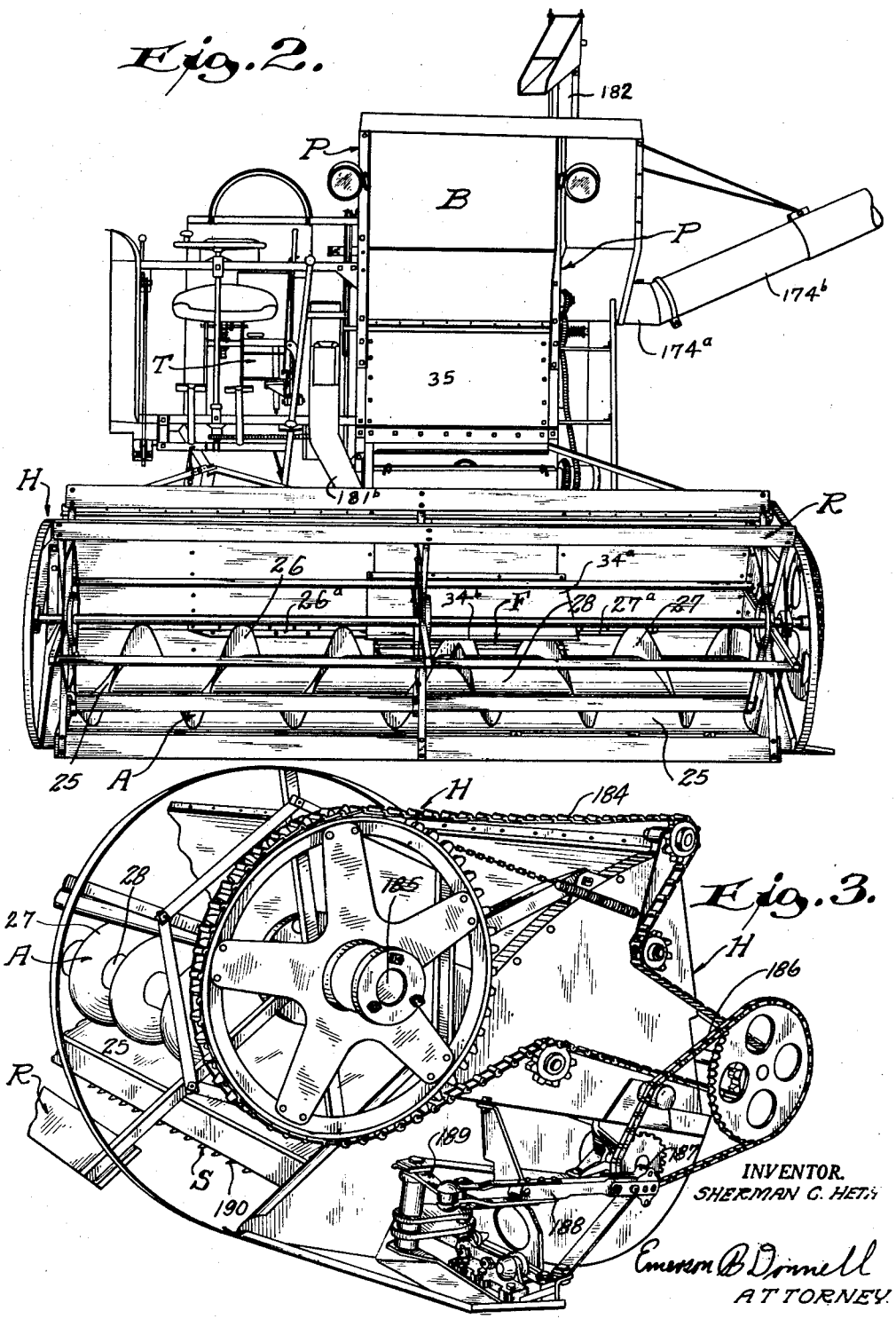

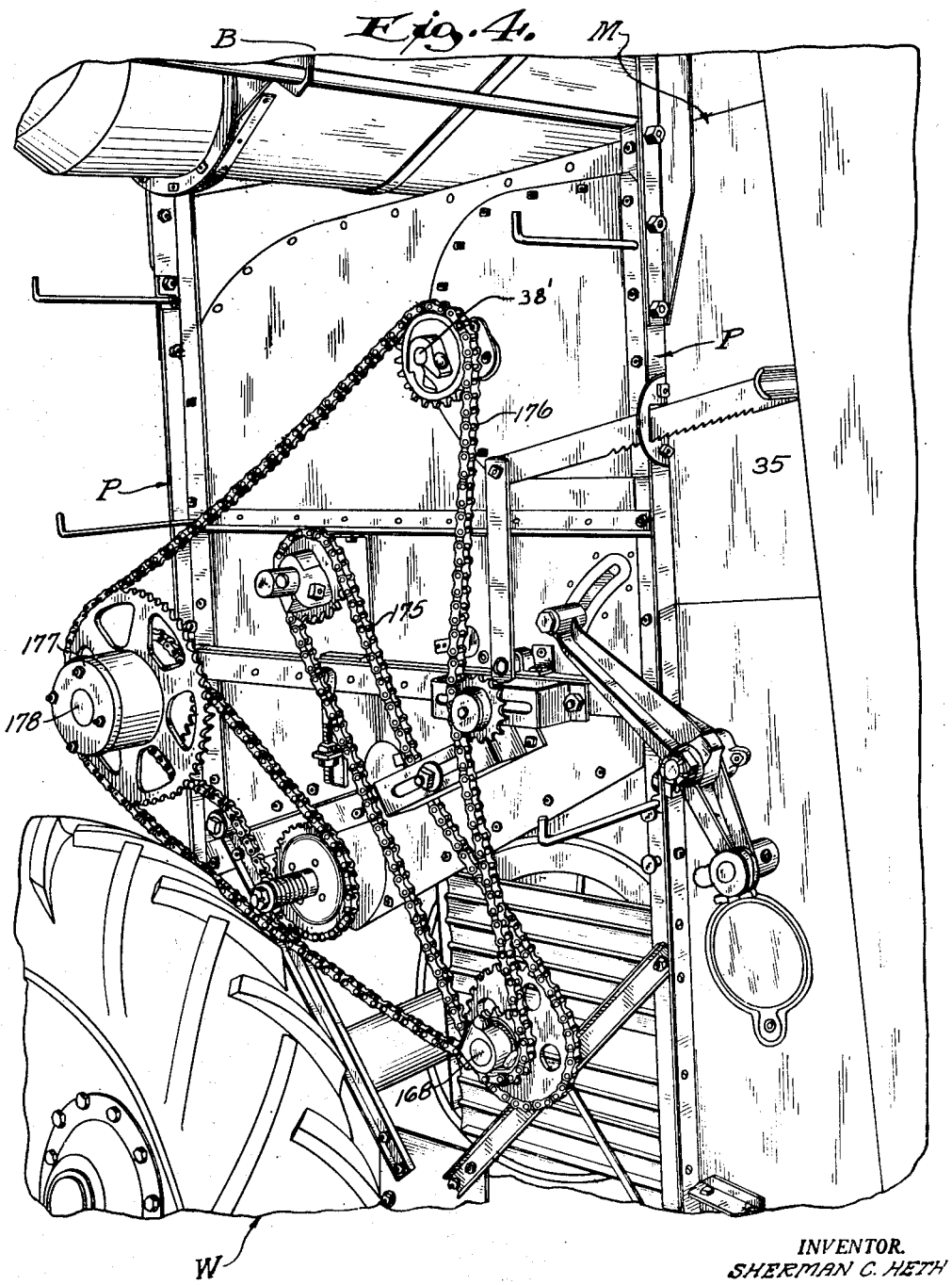

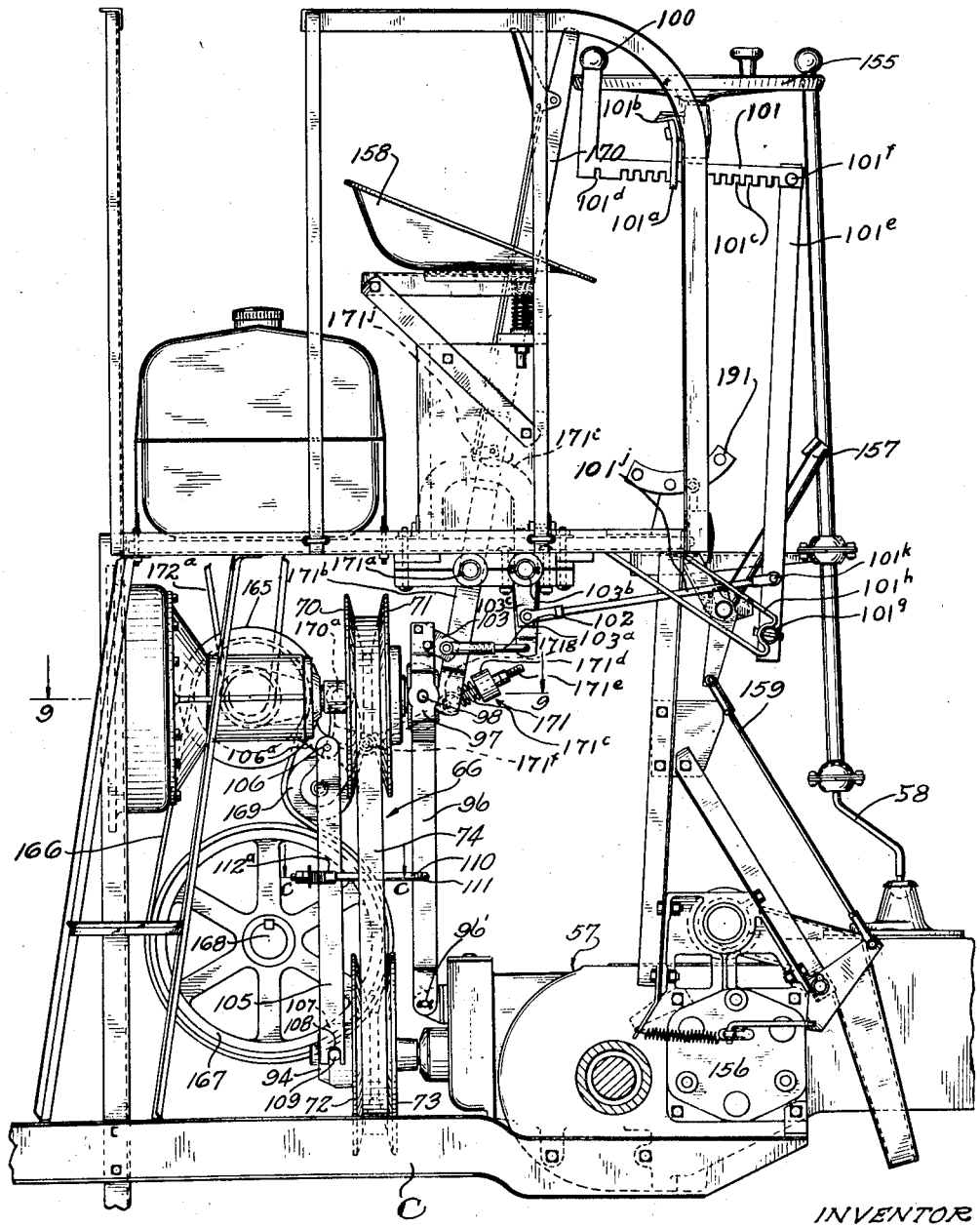

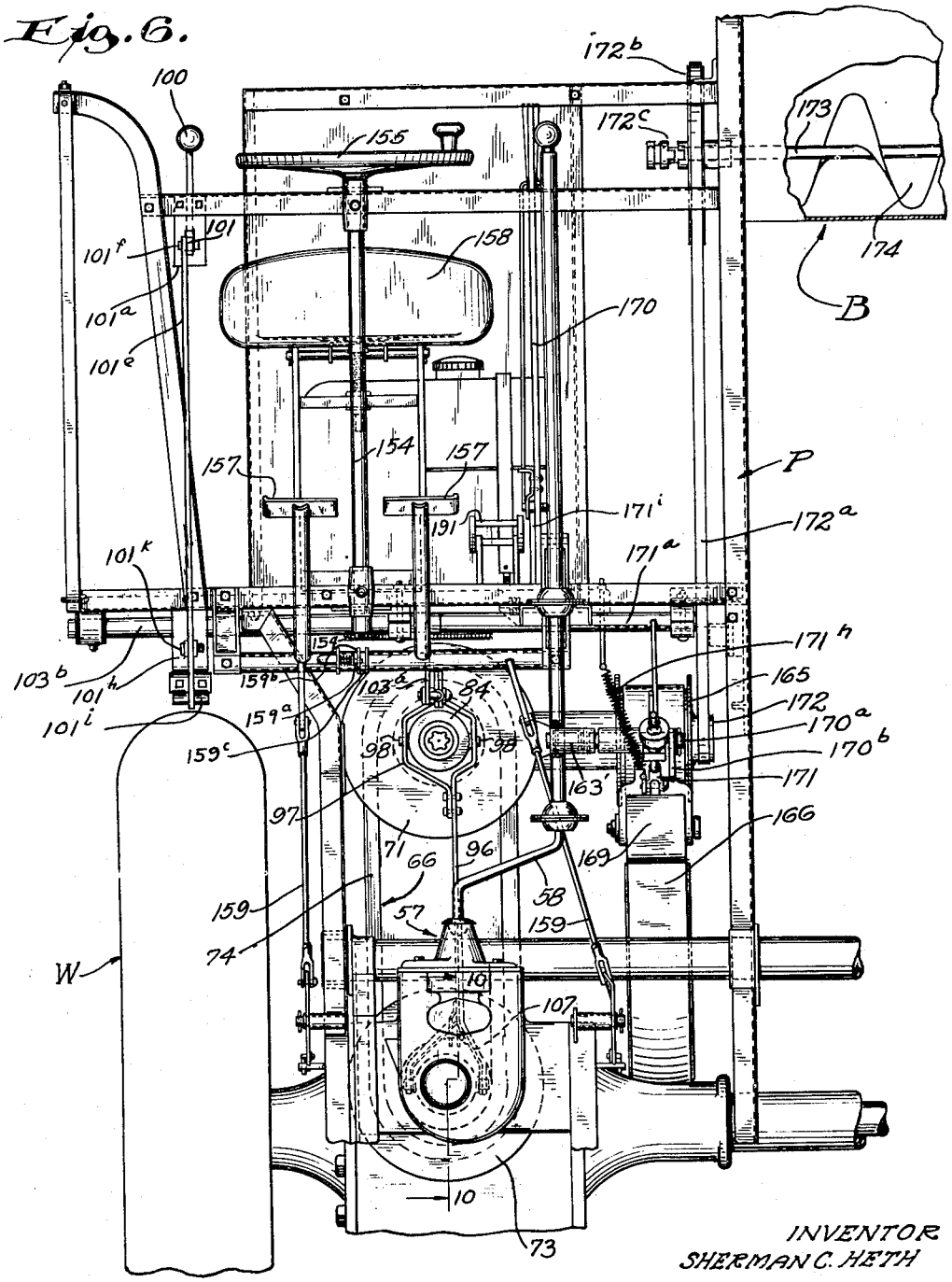

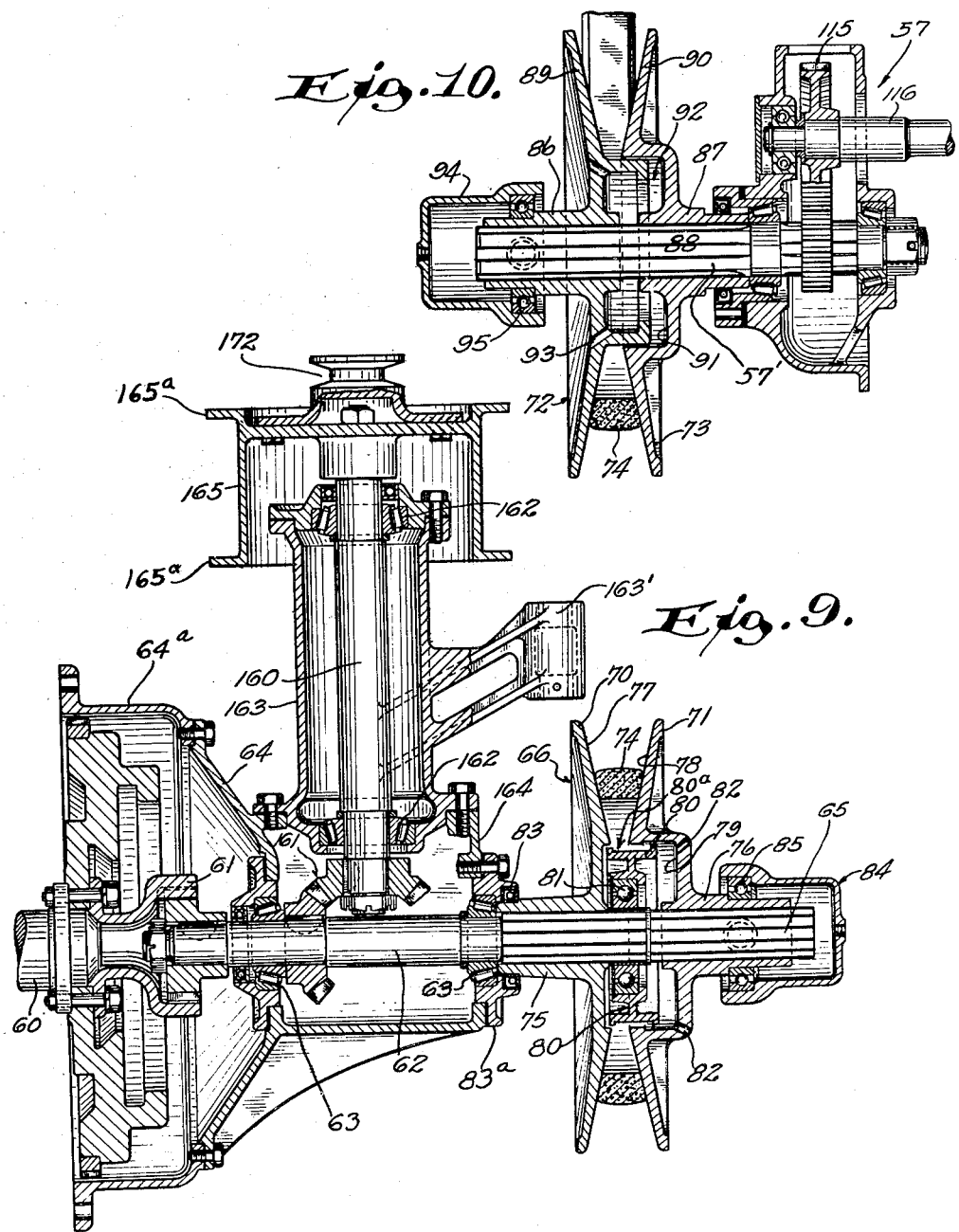

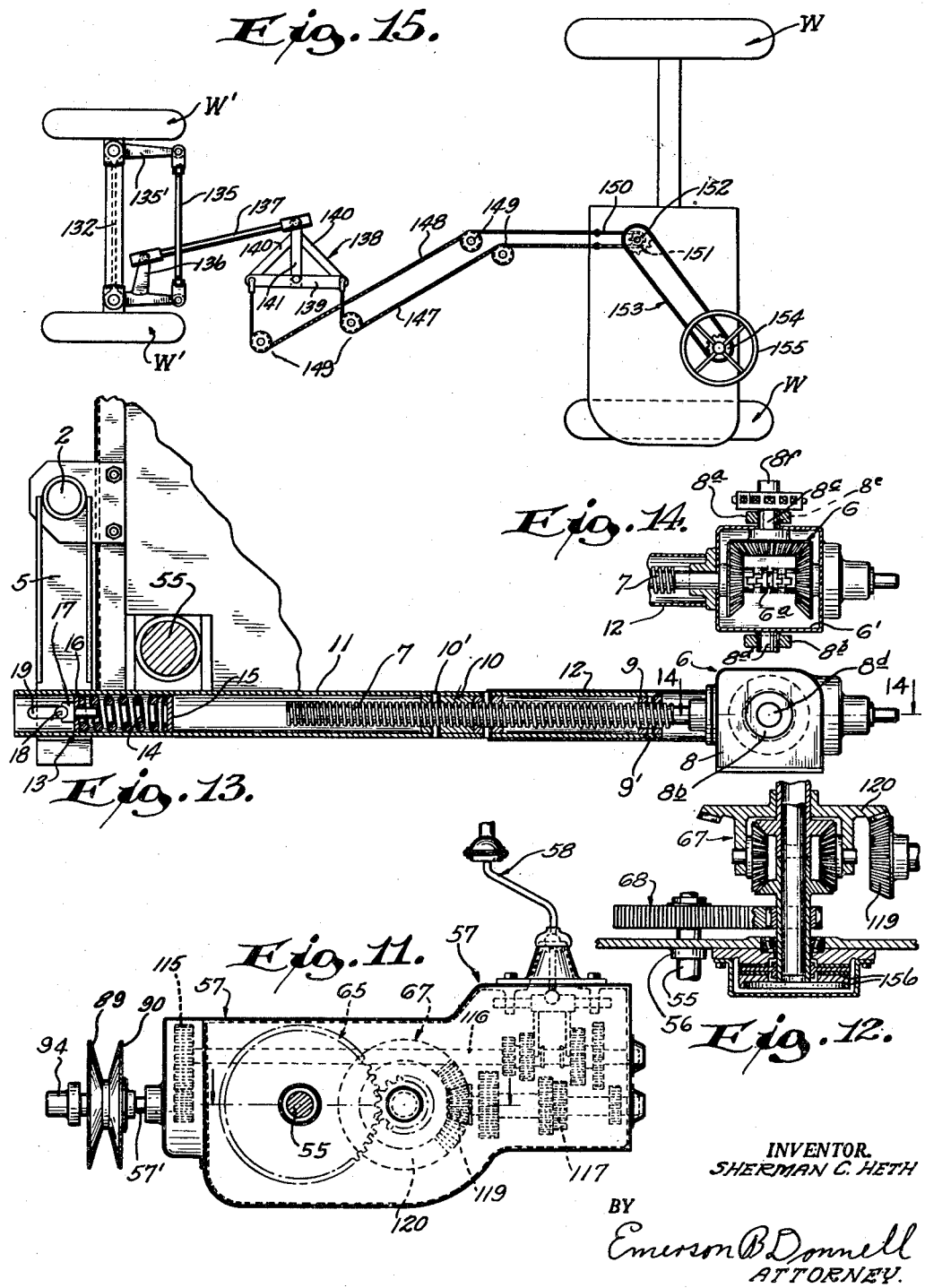

Oct. 31, 1950     S. C. HETH     2,528,275
SELF-PROPELLED COMBINATION HARVESTING
AND THRESHING MACHINE
Filed May 31, 1946     9 Sheets-Sheet 9
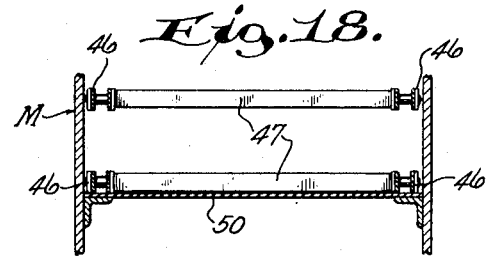
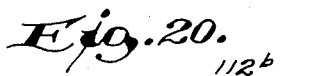
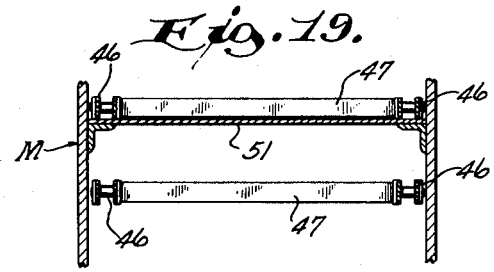
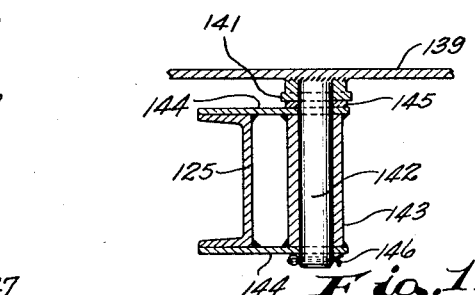
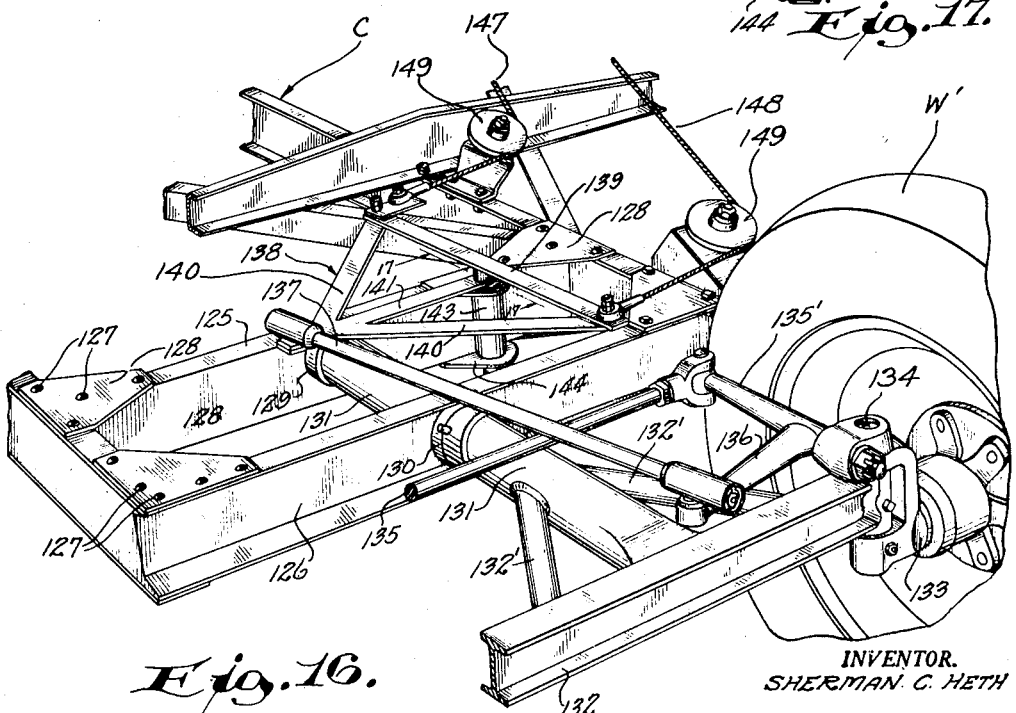
INVENTOR.
SHERMAN C. HETH
BY Emerson B. Donnell
ATTORNEY.

Patented Oct. 31, 1950

2,528,275

UNITED STATES PATENT OFFICE 2,528,275

SELF-PROPELLED COMBINATION HARVESTING AND THRESHING MACHINE

Sherman C. Heth, Racine, Wis., assignor to J. I. Case Company, Racine, Wis., a corporation of Wisconsin Application May 31, 1946, Serial No. 673,557

2 Claims. (Cl. 56—21)

This invention relates to a self-propelled combination harvesting and threshing machine or so called, "combine."

One of the general objects of the invention is to simplify and improve the construction of a machine of this character, doing this in such a way, as to make it easier and more economical to manufacture the machine, enhance its performance and efficiency in the field, and adapt it to ready and easy control by a single operator.

One of the important objects of the invention is to provide an improved header auger construction, one which is efficiently operable through the full width of the header auger trough to bring the harvested material to the center, while at the same time, feeding the material rearwardly under the auger so as to insure its delivery to the feed rake which extends from the center of the bottom of the auger through to the entrance of the threshing machine.

Massing or accumulation of material in the auger trough, overloading of the header auger, or spilling of the material therefrom cannot occur. Rapid and efficient feeding of the cut material from the auger trough to the feed rake is insured and the feed rake is so constituted, organized with the other instrumentalities and so driven that the load is on the lower run of the feeder rake which is kept taut.

Another important object of the invention is to provide a new and advantageous running and steering gear construction, one which is simple, rugged, and durable in character and lends itself to ready control by the operator.

Another and important object of the invention is to provide novel and advantageous driving and control mechanism for the operating instrumentalities of the header and of the threshing machine, the particulars of which will hereinafter be fully described and claimed. In this respect the power delivered by the engine or power plant is divided, a sufficient component going to the wheels, which propel the machine, and the other going, after the manner of a power take-off, or laterally, to the instrumentalities of the header and threshing machine.

A further object of the invention is to provide a threshing machine having a grain carrier rake of novel and advantageous construction and operating characteristics.

Still another object of the invention is to provide a novel means for supporting, and raising and lowering the header, one which is yieldable or cushioning in character to take up operating shocks and support the header in field operations so that its hinged or pivotal connections will be relieved of excessive or destructive strains.

Another object is to utilize in a novel manner in the organization and build-up of a self-propelled combine mechanisms manufactured under high production conditions so as to provide in a self-propelled combine, mechanical parts of high quality and reliability without excessive cost.

A further object is to provide a novel arrangement of platform and controls for a self-propelled combine.

These objects of the invention and other ancillary advantages are attained by the mechanism, construction, and arrangement illustrated in the accompanying drawings forming part hereof, in which:

Figure 1 is a view, partly in longitudinal vertical section and partly in elevation, somewhat diagrammatic in character, showing a self-propelled combination harvesting and threshing machine embodying the present invention;

Fig. 2 is a perspective view looking at the front or head end of the machine;

Fig. 3 is a fragmentary perspective view looking at one side of the header and illustrating the reel, header auger, and sickle drives;

Fig. 4 is a perspective view illustrating chain and sprocket gearing utilized for driving the various instrumentalities of the threshing machine, Fig. 5 is a fragmentary view in side elevation showing the forward end of the machine and especially the driving mechanism employed by the engine for driving the front wheels and also the operating mechanism for the gearing incorporated in this driving mechanism;

Fig. 6 is a fragmentary view, in front elevation with parts removed, of the front wheel driving gear illustrated in Fig. 5;

Fig. 7 is a diagrammatic view in top plan showing the way in which the feed rake is combined with the auger and auger trough and also illustrating the feed rake drive and the drives for the reel and header auger;

Fig. 8 is a diagrammatic layout illustrating the drive lines between the engine or power plant and the instrumentalities of the header and threshing machines;

Fig. 9 is a view in horizontal cross section taken on line 9—9 of Fig. 5 showing the way in which the power is taken from the engine shaft and delivered to the driving mechanism for the ground wheels and the instrumentalities of the header and threshing machine;

Fig. 10 is a view in vertical cross section taken on line 10—10 of Fig. 6;

Fig. 11 is a view in side elevation showing the way in which the V-belt pulley drive is combined with the variable speed selective transmission;

Fig. 12 is a fragmentary view partly in top plan and partly in horizontal cross section illustrating the differential and the reduction gearing employed between the sleeve shafts of the differential and also illustrating diagrammatically, the brakes combined with the differential to facilitate power steering of the machine;

Fig. 13 is a detailed view partly in side elevation, and partly in longitudinal vertical cross section, showing the power operated means for raising and lowering the header and supporting it at various adjustments;

Fig. 14 is a detailed view partly in horizontal cross section in the line 14—14 of Fig. 13, and partly in top plan showing the reversing gear employed to serve the means which raises and lowers the header;

Fig. 15 is a diagrammatic view in top plan showing the hand operated steering gear;

Fig. 16 is a fragmentary perspective view showing only one of the rear steering wheels, of which two are, of course employed, and illustrating the way in which both are mounted and controlled;

Fig. 17 is a fragmentary sectional view taken on line 17—17 of Fig. 16;

Figs. 18 and 19 are fragmentary sectional views taken on lines a—a and b—b respectively of Fig. 1; and Fig. 20 is a fragmentary sectional view taken on line c—c of Fig. 5.

GENERAL CONSTRUCTION

Referring to the drawings, and especially to Fig. 1, it will be seen that a self-propeller combine embodying the present invention comprises generally, a main frame or chassis C supported at its front end by power driven ground wheels W and at its rear end by a pair of steering wheels W' (see also Figs. 15 and 16 for the steering gear).

A vertical frame-work or superstructure comprising principally four vertical posts or columns P, preferably of angle iron and suitably braced and cross connected, is supported on and secured to the members of the frame or chassis C. The posts or columns P serve to support a separator and threshing machine M in a cantilever fashion and also provide support for a grain receiving bin B.

A header H is adjustably supported on the forward posts P and is equipped with a reel R, a sickle S, a header auger A, and a feed rake F.

An internal combustion engine E is provided for propelling the machine and for driving the instrumentalities of the header H and of the separator and threshing machine M, and is supplied with fuel from a tank T, Fig. 6.

The header

The header is shown to advantage in Figs. 1 to 3 inclusive and 7. The upper and rearward end of the header is pivotally supported on the forward end of the threshing machine so that its lower end which carries the sickle S and reel R may be raised and lowered with respect to the ground. The header H is raised and lowered by rotating a shaft 2 which has crank arms 3 (only one of which is shown) connected by links 4 with the header H (see Figure 1). As shown in Figs. 1 and 13, the shaft 2 has an actuating crank arm 5 fixed thereto. A reversing gear set 6 (see Figs. 13 and 14) drives a screw 7 in either direction or allows the same to remain stationary depending upon the adjustment of its jaw clutch 6a.

The gear set 6 is enclosed in a housing or gear box 8 rockably supported on the frame or chassis C in any suitable way, as for example by means of bearings 8a and 8b carried by the frame and co-acting respectively with trunnions 8c and 8d projecting from the sides of the gear box. The power input shaft 8e for the gear set 6 extends through the sleeve-like trunnion 8c. The shaft 8e drives the intermeshing beveled gears of the gear set 6 and is itself in turn driven from the engine E in a manner which will be hereinafter more fully described.

Shaft 8e is driven through a combination sprocket and safety clutch 8f actuated by a chain 8g, Fig. 8, driven from a sprocket 8h on fan shaft 168.

The screw 7 extends through a guide 9 disposed within and pinned as at 9' to an elongated hollow or sleeve shaft 11 and meshes with a nut 10 also disposed within and pinned as at 10' to the shaft. The shaft 11 is mounted for fore and aft movement, but is held against rotation. One end of the shaft 11 is slidably interfitted with a protecting and guide sleve 12 carried by the housing 8 of the gear set 6. The opposite end of the shaft 11 has a yieldable or cushioning driving connection with the actuating crank arm 5, the yieldable or cushioning driving connection being designated as a whole at 13. The driving connection 13 comprises a compression coil spring 14 having one end abutting a plate 15 disposed within the shaft 11 and fixed thereto. The other end of the spring engages a sliding plate 16 fitted for sliding movement in the shaft 11. The plate 16 is centrally apertured to receive the shank of a headed bearing pin 17. The head of the bearing pin 17 is provided with a concave recess interengaged with a driving pin 18 which also passes through elongated slots 19 in the shaft 11 and is in driving connection with the actuating crank arm 5. By shifting the jaw clutch 6a in one direction, the header may be lowered whereas by shifting clutch 6a in the other direction the header may be raised; and by shifting the clutch 6a in its intermediate or neutral position, the selected adjustment of the header is maintained by the screw and nut mechanism 7, 9 and 10. The heavy shocks and impacts imposed upon the header in field operations are absorbed by the spring 14 and its hinged or pivotal connections are relieved of excessive or destructive strains. Also shocks due to the instantaneous engagement of the jaw clutches are absorbed by the spring 14.

The header auger

The header auger A, Figs. 2, 3 and 7, which is of novel and special construction, operates in a suitable auger trough 25 incorporated in the structure of the header.

The flights or blade-like convolutions 26 and 27 of the auger A are fixed to a common shaft or axis 28 rotatably supported at its ends in suitable bearings provided therefor on the header as illustrated diagrammatically at 29 in Fig. 7. The flights 26 and 27 are oppositely pitched, that is, they have left and right hand leads respectively so as to feed the material delivered to the trough from the ends thereof to the center thereof (see Figs. 2 and 7). Although other arrangements are contemplated, it has also been found advantageous to have one set of flights approximately 180° ahead of the other. The auger functions not only to feed the material from the ends to the center of the auger trough, but also feeds it under the auger. The meeting ends of the flights 26 and 27 at the center of the auger are of special construction and are specially and advantageously inter-related. They overlap in an open fashion and are preferably not joined together or joined to any other element. It has been found advantageous to have the flights overlap for a distance lengthwise of the auger equivalent to approximately 25% of the diameter of the auger. It has also been found advantageous to have the pitch of the auger substantially equal to its diameter. With such a construction, massing or accumulation of material in the auger trough, overloading of the auger or spilling of the material therefrom, cannot occur, and rapid and efficient feeding of the material to the feed rake from the auger trough is insured.

While the overlapped relation of the auger flights has been described as the preferred arrangement, it is not intended to limit the present disclosure to such construction, but it is contemplated that the flights may be terminated for example in the same axial plane in front of the feed rake, but preferably spaced apart so as to avoid presenting a closed V-shaped pocket to the material which is being fed under the auger. Similarly the flights may be terminated in different axial planes but not overlapped within the contemplation of the invention. Stripper bars 26a and 27a extend forwardly from auger trough 25 into proximity to flights 26 and 27 respectively and serve to prevent winding of material around the auger in well-known manner. The material being prevented from rotating, being constrained to move longitudinally toward the feed rake F.

The feed rake

The feed rake F (see Figs. 1, 7 and 8) comprises a pair of endless chains 30 cross connected by slats 30a, the chains 30 being reeved about upper driving sprockets 31, lower driven sprockets 32 and intermediate idler and tensioning sprockets 33. The lower active run 30' of the feed rake F travels up along and a slight distance above the feed deck 34 incorporated in the header construction and extending from approximately the center portion of the auger trough to the entrance of the threshing machine or separator M.

The harvested material is fed upwardly beneath the feed rake in the manner disclosed in the application of Norman R. Krause and Sherman C. Heth, Serial No. 438,014, filed April 9, 1942, now abandoned, with the exception that, in the above application the feed rake is substantially entirely enclosed within the feeder house except for an opening in the side for admitting the auger. In the present instance the feeder house is of necessity open at the front. The upper run of feed rake F is of course running downwardly toward auger A, and in order to minimize or eliminate any tendency for the auger to throw out of the machine any prematurely threshed grain or other material, for example traveling downwardly with the upper portion of rake R, a hood or baffle 34a is extended forwardly from auger trough 25 over auger A in the region of feed rake F and has a strip of yieldable material 34b approaching as closely as practical to flights 26 and 27. Any material stripped from rake F by auger A and thrown upwardly will be intercepted by hood 34a and directed back into the auger. Any material thrown forwardly by the auger will be intercepted by incoming material being impelled by reel R, and so prevented from being lost out of trough 25.

The threshing machine

The casing 35 of the threshing machine M may be of any suitable construction and as previously indicated its forward end portion is secured to and supported by the posts or columns P, while the major portion thereof overhangs the chassis C after the manner of a cantilever, although auxiliary supporting elements may be extended between casing 35 and chassis C if desired, within the contemplation of the invention.

The threshing machine M (see Fig. 1) embodies in its construction a cylinder 36, concave 37, beater 38, straw rack 39, shaker screens 40, fan 41, grain auger 42, and tailings auger 43, all of any standard or suitable construction. Also embodied in the threshing machine is a grain carrier rake designated generally at 45 and of special construction. The grain carrier rake 45 carries the grain, fragments of straw, tailings, etc., coming predominantly through concave 37 rearwardly on one pass and also carries similar material coming through straw rack 39 forwardly on the other pass. The grain carrier rake (see Figs. 1, 18 and 19) comprises a pair of endless chains 46 cross connected by slats 47 and trained about driving sprockets 48 and driven sprockets 49. The portion of the lower run of the grain carrier rake 45a which extends rearwardly from the driving sprockets 48 to a point overlying the forward ends of the shaker screens 40 travels along and over a smooth imperforate sheet metal plate 50 while the portion of the upper run of the carrier rake 45 which extends forwardly from the driven sprockets 49 to a point overlying the forward ends of the shaker screens 40 travels over a smooth imperforate sheet metal plate 51. With this construction the material falling through the grain carrier rake and onto the plate 50 will be carried rearwardly and delivered to the shaker screens 40 while material falling from the straw rack 39 onto the plate 51 will be carried forwardly and delivered to the shaker screens 40.

Running gear and vehicle propulsion mechanism

The threshing machine is equipped with a pair of front driving wheels W and a pair of rear steering wheels W'.

The front wheels W are fixed to front axles 55 rotatably supported in suitable bearings 56 (see Figs. 11 and 12) provided therefor in the housing of a selective speed transmission designated generally at 57. The selective speed transmission 57 is manipulated by means of a conventional hand lever 58. It is incorporated in the drive line between the engine E and the front axles 55 and is securely bolted or otherwise fastened to the frame or chassis C.

The engine shaft 60 is coupled as at 61 (see Fig. 9) to an extension shaft 62 rotatably supported in bearings 63—63 provided therefor in the end closure 64 of the flywheel housing 64a of the engine. The splined end 65 of the shaft 62 is operatively interconnected with and drives a variable speed belt and pulley gearing designated generally at 66 and of the type employing expansible cone-like pulleys and a cooperable V-belt of the edge-active type (see Figs. 5, 6, 9 and 10). The belt and pulley gearing in turn drives the input shaft 57' of the variable speed transmission 57. The transmission 57 acts through a differential 67 and reduction gearing 68 to drive the front axles 55 on which the front wheels W are mounted and secured.

An important advantage arises out of the arrangement just described in that engine E, transmission and axle 57, its housing and accompanying parts such as differential 67 and brakes 156, are preferably identical with corresponding parts of a tractor, suitable parts being selected from the tractor production line and altered as necessary to adapt them to their new environment, as will further appear. The gearing and other mechanism can thus be of much better grade than would otherwise be possible in an inexpensive machine such as a combine.

*Variable speed V-belt and expansive cone pulley gearing*

The belt and pulley gearing 66 shown to advantage in Figs. 5, 6, 9 and 10 comprises upper V driving pulley members 70 and 71, lower V driven pulley members 72 and 73 and an edge-active V-belt 74.

The pulley members 70 and 71 have hubs 75 and 76 splined on the portion 65 of the shaft extension 62 and also have mating cone disks 77 and 78 integral with their respective hubs 75 and 76.

The driving pulley member 71 is chambered as at 79 to accommodate, in certain relative axial adjustments of the pulley members 70 and 71, a loose ring or sheave 80 on which the belt 74 rests in the neutral position of the belt and pulley gearing 66. The loose ring 80 is disposed between the pulley members 70 and 71 and is mounted on the portion 65 of extension shaft 62 by means of a ball bearing assembly 81 so that while the loose ring 80 may not shift axially with respect to the shaft extension 62, the rotation of the shaft extension 62 will not be imparted to the loose ring 80. To accomplish this purpose, the inner race of the ball bearing assembly 81 is fixed to the shaft extension 62, the outer race is fixed to the hub of the loose ring 80 and the balls interposed between the races provide for the desired capacity for free relative rotary movement as between the loose ring and shaft.

The portion of the pulley member 71 defining the chamber 79 is provided with oil drainage passageways 82 to prevent access of oil to belt 74 and impairment thereof.

An oil retainer 83 is provided between the inner end of the hub 75 of the pulley member 70 and a cap 83a bolted or otherwise fixed to a portion of end closure 64.

A shifter 84, preferably of cap-like construction, is mounted on the hub 76 of the pulley member 71 so as to constrain the hub 76 and pulley member 71 to move axially with it along the portion 65 of shaft extension 62 while allowing the hub 76, pulley member 71 and the shaft extension 65 to rotate freely relative to it. This is accomplished by interposing a ball bearing assembly 85 between the shifter 84 and the hub portion 76 of pulley member 71 with the inner race member fixed to the hub, the outer race member secured to the shifter, and the balls between the races providing for the desirable relative rotation.

The driven pulley members 72 and 73 have hubs 86 and 87 splined on the input shaft 57' of the transmission 57 and also have mating cone disk portions 89 and 90 integral with their respective hubs 86 and 87. The driven pulley member 73 is chambered as at 91. A ring or annulus 92 integral with the disk 89 of pulley member 72, telescopes into the chamber 91 and bridges the space between the inner peripheral edges of the cone shaped portions of the disks 89 and 90 in all relative axial adjustments of the disks. The chambered portion within annulus 92 is provided with oil drain passageways 93.

A shifter 94, similar in construction to the shifter 84, is combined with the hub 86 of disk 89 by means of a ball bearing assembly 95 so as to be capable of positively shifting the hub 86 and its integral disk 89 axially in either direction while leaving the disk 89, hub 86, and shaft 88 free to rotate relative thereto.

A shifting lever 96, Figs. 5 and 6, is fulcrumed at its lower end as indicated at 96' on the transmission housing 57. Adjacent its upper end the shifting lever 96 is provided with a yoke formation 97 (see Figs. 5 and 6) which straddles the shifting cap 84 and is pivotally connected thereto by virtue of the provision of trunnions 98 fixed to and projecting laterally from the cap 84 and interfitted with aligned pivot openings provided in the opposite sides of the yoke 97. A hand lever 100 conveniently manipulable by the operator is connected to the upper end of the shifting lever 96 as will appear so as to control the rate of movement of the combine and is rigidly connected with a rack portion 101 extending through a detent plate 101a fixed on a guard rail 101b, rack 101 providing a plurality of downwardly open notches 101c engaging plate 101a for holding rack 101 in selected positions. A special notch 101d when engaged with the plate results in a neutral or non-moving condition of the combine. Rack 101 is connected to a lever 101e by means of a pivot 101f, lever 101e being fulcrumed on a tubular or other suitable pivot 101g bolted or otherwise fixed to brackets 101h and 101i. Lever 101e actuates, through a push rod 101j pivoted thereto at 101k a link 102 pivoted to an ear 103 on lever 96, link 102 being pivoted to downwardly extending lever arm 103a rigid with a rock shaft 103b having a second downwardly extending arm 103c to which push rod 101j is pivotally connected. A second shifting lever 105 has its upper end fulcrumed at 106 to a bracket 106a stationary part of the machine. The lower end of the shifting lever 105 is bifurcated as at 107 and has the forks or arms of the bifurcated end notched as at 108, and embracing transversely aligned trunnions 109 fixed to and projecting laterally from the shifting cap 94. A link 110 has one end pivotally interconnected as at 111 to an intermediate portion of the shifting lever 96 and its other end slidably and yieldably interconnected to an intermediate portion of the shifting lever 105 as indicated at 112 (see Fig. 20) so as to co-ordinate the action of lever 105 with the action of the lever 95 and consequently co-ordinate the action of the lower driven pulley members 72 and 73 with the action of the upper driving pulley members 70 and 71. As seen in Fig. 20, link 110 slides through a block 112a which has a trunnion 112b pivotally engaged with lever 105, the block being urged to the right in Fig. 20 by a spring 112c in the present instance compressed between the block and lock nuts 112d on link 110. Spring 112c serves to urge levers 96 and 105 continuously toward each other so as to tend to "close up" the pulleys and keep belt 74 at a predetermined tension throughout the normal range of driving speeds. However, when it is desirable to stop the forward travel of the combine, lever 9, through the action of the hand lever 100, is moved to the right thereby moving pulley member 71 away from member 70 and causing belt 74 to run on a smaller effective diameter. At the same time link 110 moves lever 105 so as to shift pulley member 72 toward member 73. Belt 74 will then run on a larger diameter on the driven pulley, the total effect being to substantially reduce the speed of movement of the combine. When pulley member 72 contacts member 73, the slowest possible speed is reached. Further movement of lever 100 with accompanying further compression of spring 112c then moves pulley member 71 further away from member 70 so that belt 74 drops onto ring 80 which, as above described, remains stationary, members 70 and 71 continuing to rotate without driving belt 74. To avoid dragging of members 70 and 71 on belt 74, ring 80 is provided with a centering groove 80a with which belt 74 engages under these conditions.

Reverse motion of lever 100 allows members 70 and 71 to frictionally engage the edges of belt 74 and start the combine, the belt slipping momentarily while overcoming the inertia but then driving at the desired speed under control of lever 100.

When the speed of travel is to be reduced, it is necessary to compress pulley members 72 and 73 which may require substantial force, due to the wedging tendency of the working belt to force them apart. Spring 112c is so proportioned that it will close up completely after limited movement of lever 96 if lever 105 does not move, and further movement of lever 96 actuates lever 105 positively through link 112 and the now unyielding spring.

*Variable speed selective type transmission, differential and reduction gearing drive for front wheels*

As shown in Figs. 5, 11 and 12, and as previously indicated, the driven pulley members 72 and 73 are splined on the input shaft 57' of the selective variable speed transmission 57. Reduction gearing 115 transmits the power from the input shaft 57' to the main drive shaft 116 of the transmission. The transmission includes the standard change speed gears 117 controllable by gear shift lever 58 and also has a pinion 119 meshing with and driving the master gear 120 of the differential 67.

The adaptation of tractor parts to the present invention applies to the shaft 116 in transmission 57. In use in a tractor, shaft 116 is extended to the rear as a power take-off shaft, while for combine use, with the addition of the reduction gear 115 it becomes the main power input shaft as stated.

*Steering gear*

A special mounting is provided for the rear steering wheels W'. As shown in Fig. 16 the rear end of the chassis C is equipped with two parallel cross channels 125 and 126 rigidly fastened to the main side members of the chassis C by means of rivets 127 and gusset plates 128. Longitudinally aligned bearings 129 and 130 are provided on the cross channels 125 and 126. A supporting shaft or tube 131 is fitted in said bearings for rotative movement about its longitudinal axis. Suitable collars pinned or otherwise fixed to the shaft 131 prevent axial movement thereof while permitting free rotation about its longitudinal axis. The rearward end of the supporting shaft 131 projects well to the rear of the rearward cross channel 126 and its rearward extremity is securely fastened to the central portion of the rear main axle 132 and braced in its connection therewith by braces 132'. The rear axle assembly of the machine is of the standard type commonly employed at the front of automotive vehicles of the passenger or truck type having the usual rear wheel drive. This main axle 132 is inter-connected with the bifurcated ends of the usual stub axles by the usual king pins 134 so that the wheels W' mounted on the stub axles 133 may be swung for steering. The stub axles are inter-connected by the standard tie rod 135 and arms 135'. An arm 136 rigid with one of the arms 135' is suitably inter-connected with the rearward end of a drag link 137. The forward end of the drag link 137 is pivotally interconnected to the apex of a triangularly shaped lever designated generally at 138. The lever 138 is constructed of four metal bars, namely a base bar 139, inclined side bars 140, each fixed at one end to an end of the base bar 139 and pivotally interconnected at their meeting ends to the forward end of the drag link 137 and a central bar 141 also inter-connected at one end with the meeting ends of the side bars 140 and pivotally inter-connected with the forward end of the drag link 137 while its opposite end is welded or otherwise fixed to the central portion of the base bar 139. A fulcrum pin 142 (see Fig. 17) is welded at its upper end to the intersecting portions of the base bar 139 and central bar 141 and is rotatably fitted in a sleeve bearing 143 provided therefor and mounted on and welded to supporting brackets 144 carried by and welded to the cross channel 125. A washer 145 is interposed between the underside of the central bar 141 and the upper end of the sleeve bearing 143. A cotter pin 146 limits upward displacement of the fulcrum pin 142. Steering cables 147 and 148 are connected to the base corners of the triangular lever 138, and reeved about suitably positioned guide pulleys 149 and connected to the ends of a sprocket chain 150 (see Fig. 15). The sprocket chain 150 meshes with a sprocket wheel 151 fixed to a shaft 152 in turn driven by chain and sprocket gearing 153 from a steering shaft 154 equipped at its upper end with a steering wheel 155.

To further facilitate steering and especially sharp turning, foot operated brake assemblies 156 are interposed between sleeve shafts 156' driven from the differential 67 and the reduction gear sets 68 (see Fig. 12). Foot pedals 157, Figs. 5 and 6, within convenient reach of the operator when he occupies seat 158 are provided to control the clutch and brake assemblies. Suitable links and levers 159 operatively inter-connect each foot pedal 157 and its respective brake assembly 156 so that pressure on either pedal will cause application of the brake on that side of the combine and assist materially in steering in that direction. In this manner sharp turns may be made with ease, and working in small fields is greatly facilitated.

When it is desired to run at relatively high speed, as for example on the highway, such individual operation of the brakes is ordinarily not desirable, and the two pedals 157 may then be latched together by a latch 159a engaged with a bracket 159b and engageable with a bracket 159c to lock the pedals to move in unison. Actuation of either pedal then operates both brakes as will be understood.

*Drive gear for the header and threshing machine*

The engine E is utilized also as the source of power for driving the various instrumentalities of the header and of the threshing machine. For this purpose a shaft 160 (see Fig. 9) is extended laterally and horizontally from the shaft extension 62 and is driven therefrom by bevel gearing 161. The shaft 160 is supported for rotation in bearings 162 provided therefor in a supporting housing 163 bolted to a gear casing 164 forming part of end closure 64 which is in turn bolted to and supported on flywheel housing 64a. An additional supporting arm 163' integral with the housing 163 and suitably supported on the frame of the machine is employed for supporting a belt tightener as will appear.

A drum-like driving pulley 165 is fixed to the portion of the shaft 160 which projects beyond its housing. A belt 166, Figs. 5 and 6, is reeved about the driving pulley 165 and also about a driven pulley 167 fixed to the fan shaft 168. A belt tightener is provided for the belt 166 and may take the form of an idler pulley 169 engaged with the belt 166 and controlled as to position by a hand lever 170. For this purpose above mentioned bracket 163' carries a pivot 170a on which is journaled a bifurcated lever arm 170b on which above mentioned idler 169 is rotatably supported. Lever 170b is controlled from above mentioned lever 170 by means of a linkage generally designated as 171. Lever 170 is fixed on a rock-shaft or tube 171a and having a downwardly extending arm 171b preferably bifurcated and enclosing a spring 171c as best seen in Fig. 5. Spring 171c is secured to a cap 171d adjustably fixed on a rod 171e pivoted at 171f to above mentioned arm 170b. Spring 171c is engaged with arm 171b as by means of a hook and pin connection 171g. Forward movement of lever 170 as seen in Fig. 5 will therefore cause backward movement of arm 171b and tensioning of spring 171c. This will cause movement of rod 171e to the left and swinging of lever arm 170b in a clockwise direction about pivot 170a, pressing idler 169 against belt 166. A convenient control of the threshing machinery is thus provided, belt 166 being loose enough so that pulley 165 rotates freely within the belt without driving, in the absence of pressure from idler 169. A spring 171h, Fig. 6, pulls idler 169 away from belt 166 when permitted by lever 170. The latter has a quadrant 171i provided preferably with a single notch engaged by a detent 171j so that lever 170 has only one engaged position. With lever 170 in this position, cap 171d is adjusted to tension spring 171c for the desired tension in belt 166 whereby this tension will be automatically attained and maintained whenever lever 170 is latched, without special attention on the part of the operator. Furthermore, it becomes impossible to over-stress belt 166 so long as spring 171c is correctly adjusted, since the ultimate pressure is a function of the spring pressure.

Pulley 165 is provided with flanges as 165a, Fig. 9, to prevent belt 166 from running off of pulley 165 when it is not driving.

Pulley 165 is provided with an additional groove 172, for driving a bin unloading auger. A belt 172a extends upwardly to a pulley 172b actuating, through a clutch 172c a shaft 173 connected in driving relation to an unloading auger 174 within above mentioned bin B. Auger 174 works within a spout 174a extending from bin B and having an extension 174b in position to overhang a receiving vehicle. Bin B may therefore be unloaded into a truck or the like while the combine is moving, or the combine may be stopped beside a receptacle and unloaded, whichever is most convenient. The capacity of auger 174 is ample to unload the bin regardless of the additional grain being delivered into it by elevator 182.

Motion is transmitted from the fan shaft 168 to the instrumentalities of the threshing machine and of the header. A convenient way for the transmission of this motion is by means of chain and sprocket gearing. Referring particularly to Figs. 4 and 8 it will be seen that chain and sprocket gearing 175 is provided to drive the cylinder 36 from the fan shaft 168. Chain and sprocket gearing 176 is provided to drive the beater 38 and also through a slip clutch 177, a shaft 178. The shaft 178 in turn drives the sprocket chains 30 of the feed rake F. The beater shaft 38' acts through chain and sprocket gearing 180 to drive the tailings elevator drive sprocket 181, a tailings elevator 181a, Fig. 1, of well-known form being extended along the side of threshing machine portion M and actuating above mentioned tailigs auger 43. Elevator 181a has a spout portion 181b discharging into a hopper 181c carried by a wall of feeder house H and having an outlet or tailings conducting spout 181d directed so as to discharge the tailings into the space between the runs of feed rake 30 or on top of the ascending run 30' of rake F. In this manner is avoided any difficulty from throwing out of the open front of the feeder house material which might be engaged by the descending run 30 of the rake F. This arrangement and hood 34a assist each other in preventing loss of grain.

Above mentioned chain 8g also drives a sprocket 181e, Fig. 8, which is connected through a shaft 42a with and drives above mentioned grain auger 42 and which drives in well-known manner a clean grain elevator 182.

The driven shaft 183 of the feed rake F is utilized through chain and sprocket gearing 184 to transmit motion to the reel shaft 185. The driven sprocket 185a of chain and sprocket gearing 186 is provided with a crank pin 187. The crank pin 187 drives a pitman 188 which acts through a bell crank 189 to reciprocate the cutting blade 190 of the sickle S.

Sprocket 185a is fixed on the extension of shaft or cove portion 28 of auger A so that rotation of sprocket 185a drives auger A. It will now be apparent that all the instrumentalities of header H are driven through feeder rake F. This is advantageous for the reason that feeder house H swings up and down about shaft 178 which maintains its position relatively to shaft 168, while shaft 32 maintains its spacing from shaft 178. In this manner no difficulty is experienced from interference with chain tension by reason of height adjustments of header H. Also a convenient means of transmission of power to the chain gearing 184 and 186 is provided in spite of the fact that they do not line up with clutch sprocket 177. Furthermore, the additional load on sprockets 32, maintains a desirable tension in the lower run 30' of feed rake F so that it will not be forced away from deck 34 by the pressure of material being conveyed upwardly thereon.

The manner in which the propulsion and steering of the machine is controlled has been previously described. The control of the instrumentalities of the header and of the threshing machine is also under the convenient control of the operator by simple manipulation of the hand lever 170 which applies or relieves the belt 166 of tension and thereby effects the drive of the fan shaft 168 or allows the same to stand at rest.

Shifting of clutch 6a for raising and lowering header H is accomplished by rocking a foot pedal 191, suitable link connections of well-known form extending to the clutch and shifting it in response to rocking of the pedal. Rocking the pedal in one direction causes the header to rise and rocking the pedal in the other direction causes the header to lower.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

I claim:

1. In a self-propelled combine including a header portion and a thresher portion, an engine mounted on the combine, a running gear for the combine, threshing mechanism associated with the thresher portion and a motion transmitting connection from the engine to the threshing mechanism, a drive for the running gear including spaced flanged expansible driving and driven V belt pulleys, a V belt on the pulleys normally engaging the flanges thereof, manually controlled means for simultaneously expanding one and contracting the other of said pulleys, and an auxiliary sheave journaled within the driving pulley in position to receive and support the V belt at such times as the driving pulley is sufficiently expanded and said sheave having a belt receiving groove having margins spaced inwardly from the flanges in the expanded position of the pulley and into which said belt enters so as to be guided and prevented from slidingly contacting with the rotating driving pulley in such expanded position in spite of continued rotation of said pulley.

2. In a self-propelled combine including a header portion and a thresher portion, an engine mounted on the combine, a running gear for the combine, threshing mechanism associated with the thresher portion and a motion transmitting connection from the engine to the threshing mechanism, a drive for the running gear including spaced expansible driving and driven V belt pulleys, a V belt on the pulleys, manually controlled means for simultaneously expanding one and contracting the other of said pulleys including lever arms associated with the pulleys and a manually operable connection from said manually controlled means to one of the lever arms, a connection from said lever arm to the other lever arm including a spring, expansible for exerting yielding pressure against said levers for compressing both pulleys to maintain desired belt tension and said spring comprising a series of coils and spaces, said spaces being so proportioned as to render said spring compressible to the solid condition to provide a positive connection from said manually operable connection to said other lever arm.

SHERMAN C. HETH.

REFERENCES CITED

The following references are of record in the file of this patent:

UNITED STATES PATENTS

| Number | Name | Date |
|---|---|---|
| 1,198,445 | Horacek | Sept. 19, 1916 |
| 1,323,502 | Thomas et al. | Dec. 2, 1919 |
| 1,914,839 | Thoen | June 20, 1933 |
| 1,977,312 | Knapp | Oct. 16, 1934 |
| 2,170,573 | Pierson | Aug. 22, 1939 |
| 2,212,465 | Baldwin | Aug. 20, 1940 |
| 2,310,577 | Everett | Feb. 9, 1943 |
| 2,318,409 | Millard et al. | May 4, 1943 |
| 2,336,002 | Everett | Dec. 7, 1943 |
| 2,378,615 | Brown | June 19, 1945 |